United States Patent [19]
Zwitter et al.

[11] 3,855,514
[45] Dec. 17, 1974

[54] BIDIRECTIONAL VCO FOR A CLOSED LOOP POSITION MEASURING SYSTEM

[75] Inventors: Thomas M. Zwitter, Newbury; Ronnie G. Walters, Mayfield Heights, both of Ohio

[73] Assignee: Allen-Bradley Company, Milwaukee, Wis.

[22] Filed: June 25, 1973

[21] Appl. No.: 372,967

Related U.S. Application Data
[62] Division of Ser. No. 194,426, Nov. 1, 1971, Pat. No. 3,764,831.

[52] U.S. Cl.................. 318/660, 318/605, 318/607
[51] Int. Cl. ........................................... G06f 15/46
[58] Field of Search .......... 318/660, 607, 608, 605; 307/271; 235/151.11

[56] References Cited
UNITED STATES PATENTS

| | | | |
|---|---|---|---|
| 3,247,504 | 4/1966 | Emmerich | 318/660 X |
| 3,340,451 | 9/1967 | Farrand | 318/660 |
| 3,660,782 | 5/1972 | Levy | 307/271 |
| 3,668,377 | 6/1972 | Inaba | 318/660 |
| 3,764,831 | 10/1973 | Zwitter et al. | 307/271 |

*Primary Examiner*—B. Dobeck
*Attorney, Agent, or Firm*—Lindenberg, Freilich, Wasserman, Rosen & Fernandez

[57] ABSTRACT

A bidirectional voltage controlled oscillator for a closed loop position measuring system in a numerical control servomechanism, and for other similar systems, comprised of means for integrating a DC input signal to produce a ramp signal with a slope proportional to the amplitude of the input signal and a polarity related to that of the input signal. A pair of comparators determines when the output of the integrator exceeds a predetermined threshold level of either polarity, and in response thereto activates both means for transmitting a single pulse when that level is exceeded and means for storing the polarity of the integrator output signal at that time until a new determination is made. The transmitted pulse resets the integrating means to start another pulse generating cycle. In the event of integrator saturation, further means responsive to the outputs of the comparators enables system clock pulses to be transmitted for a maximum output pulse rate.

10 Claims, 5 Drawing Figures

BIDIRECTIONAL VCO FOR A CLOSED LOOP POSITION MEASURING SYSTEM

This application is a division of application Ser. No. 194,426, filed Nov. 1, 1971 now U.S. Pat. No. 3,764,831.

BACKGROUND OF THE INVENTION

This invention relates to a bidirectional, voltage-controlled oscillator (VCO), and more particularly to a bidirectional VCO for a closed loop position measuring system in a numerical control system.

In numerical control systems for machine tools, there is generally one closed-loop servomechanism for each axis of control. Usually the control data for these axes are read from a punched paper tape into a director which routes command and reference signals to the appropriate axis control loops.

Information regarding the actual position of the machine tool in a given axis is obtained through the use of a resolver having its rotor shaft driven by the axis drive mechanism. The two stator windings are excited by amplitude modulated sinusoidal voltages (sine and cosine) of a carrier signal. As the rotor is driven through a given angle, its output signal will vary in amplitude as a function of the sine of the angle. Synchronous demodulation of the resolver output amplitude yields position data for the drive mechanism.

Linear motion of a machine tool is easily converted into rotary (angular) motion for the rotor drive shaft through the use of gears. For example, a linear drive system for a machine tool with an accuracy of 0.0001 inch may be converted into a rotary motion using a rack and a pinion with a gear ratio such that one 360° revolution occurs for each 0.1 inch of linear motion. Accordingly, a resolver can be used in a linear motion control system.

Another type of position transducer (sold under the registered trademark Inductosyn) is available for either rotary or linear motion. Like a resolver, two stators are driven by sinusoidal voltages of a carrier signal in phase quadrature. It differs electronically from a resolver only in that the carrier waveform appearing at the output of the rotor or scale is shifted 90°. Accordingly, in a closed loop servomechanism, the difference between a resolver and an Inductosyn transducer for position feedback is in the mechanization of the synchronous demodulator; for the resolver, the carrier signal is used as a reference signal in the demodulator without modification, while for the Inductosyn, the carrier signal is shifted 90° for use as a reference in the demodulator. In view of this great similarity, these two transducers are referred to hereinafter generically as "position follow-up devices," or more simply as devices.

The servomechanism integrates a train of pulses received from a director as a command, and converts these integrated pulses into equivalent mechanical motion. Considering a closed-loop operation for a single axis, there is a source of position command pulses that controls a prime mover, such as a hydraulic motor. The output of the numerical control circuit which controls the prime mover is proportional to the difference between the present axis position and the desired axis position. Axis position data is provided as feedback in the servo loop by converting the mechanical motion of the machine axis into positive and negative pulses ($\pm\Delta\phi$) weighted at some convenient measure of distance. The feedback pulses are subtracted from the command pulses in the digital integration process. The feedback pulses are subtracted from the command pulses in the digital integration process. When the drive mechanism is in the commanded position, it is motionless and the digital integration output will be zero.

If the position of the prime mover is to be changed by a small amount in response to a command, positive or negative feedback pulses will be generated as a result of this command which, through the digital integration process, nulls the axis drive servomechanism. A positioning system commonly employs a feedback device to convert a change in machine axis position to feedback pulses ($\pm\Delta\phi$). Because the machine axis is coupled to the feedback device, axis motion decreases the magnitude of the integration output signal (due to negative feedback) until the magnitude of that signal is zero, at which time motion ceases. Such a closed loop servomechanism is commonly referred to as a numerically controlled positioning system.

In order to convert the change in mechanical coupling of a position follow-up device into feedback pulses, the device employs another closed-loop servomechanism (referred to hereinafter as the "inner loop"). The function of the inner loop is to provide the feedback pulses in the form of $\pm\Delta\phi$ pulses while the phase ($\phi$) of sine and cosine signals modulating the carrier signal $\cos(\omega t+\phi_o)$ is updated to the new position of the axis represented by the device coupling ($\theta$). Any difference between the "updating position" of the drive ($\phi$) for the device and the mechanical coupling ($\theta$) of the device produces an output error signal $\sin(\phi-\theta)\cos(\omega t+\phi_o)$, which in time causes further feedback pulses to be generated, and thereby causes adjustments of the phase ($\phi$) of the sine and cosine modulating signals to match the mechanical coupling ($\theta$) of the device. In practice, the process of updating the phase of the modulating signals through sine and cosine generators is carried out with counters which effectively respond to the sign and magnitude of the error signal $\sin(\phi-\theta)\cos(\omega t+\phi_o)$.

Assuming a resolver is selected as the position follow-up device in a servo-mechanism, the generator of the sine and cosine modulating signals produces the sinusoidal voltages $\sin\phi\cos(\omega t+\phi_o)$ and $\cos\phi\cos(\omega t+\phi_o)$, where $\phi$ is the feedback system phase, $\omega$ is $2\pi$ times the frequency of the carrier signal, and $\phi_o$ is the phase of the carrier signal also used as a reference for synchronous demodulation of the error signal from the rotor of the resolver given by the following equation:

AC ERROR $= \sin\phi\cos\theta\cos(\omega t+\phi_o) - \cos\phi\sin\theta\cos(\omega t+\phi_o) = \sin(\phi-\theta)\cos(t+\phi_o)$  1.

The feedback error thus drives the inner loop via the sine and cosine generator, until the feedback systems phase $\phi$ is equal to the mechanical coupling $\theta$, i.e. until $\sin(\phi-\theta)=0$. The output signal of the rotor is then simply $\sin(0°)\cos(\omega t+\phi_o)$ in the synchronous demodulator to produce a zero error signal. In other words, the inner loop operates in such a way as to null the amplitude of the error signal given by Equation (1) such that $\sin(\phi-\theta)$ is zero when the phase angle $\phi$ equals the position angle $\theta$.

As noted hereinbefore, the only difference between a resolver and an Inductosyn of either the rotary or linear motion type is that the Inductosyn internally shifts the reference waveform $\cos(\omega t)$ by 90°. Accordingly, the Inductosyn output error signal is given by the following equation:

AC ERROR = $\sin \phi \cos \theta \sin (\omega t+\phi_o) - \cos \phi \sin \theta \sin (\omega t-\phi_o) = \sin (\phi-\theta) \sin (\omega t+\phi_o)$  2.

A comparison of Equation (2) with Equation (1) clearly shows that any servomechanism having an internal loop for position measuring can use either an Inductosyn or a resolver. If the numerical control system is designed for use with a resolver, an Inductosyn may be substituted in those applications where the use of an Inductosyn is indicated by simply including a 90° phase shift network for the reference waveform applied to the demodulator.

The error signal $\sin (\phi-\theta) \cos (\omega t+\phi_o)$, or $\sin (\phi-\theta) \sin (\omega t+\phi_o)$, must be demodulated to provide the pulse train $\pm\Delta\phi$ required to update the inner and outer loops, i.e. to update the position measuring loop and the closed-loop servomechanism for the particular axis control. A typical demodulator is shown in a copending application Ser. No. 106,501 filed Jan. 14, 1971, by Thomas M. Zwitter and assigned to the assignee of the present invention. There the sign and magnitude of the error signal are separated by the synchronous demodulator, and the magnitude is employed to produce pulses at a linearly proportional rate using a VCO synchronized by the reference signal.

Other and more conventional position measuring systems also employ a synchronous (phase sensitive) demodulator to develop from an AC error signal a DC error signal and a sign signal. The DC error signal is used to control the output frequency of the VCO, and the separate sign signal is used in the position follow-up system to effectively "count up" the VCO pulses when the sign is positive and to "count down" the VCO pulses when the sign is negative.

The VCO in these prior-art systems often has a threshold adjustment made to assure that it is quiet at null, but then the VCO will have an inherent deadband equal to $\pm T$, where T is the threshold adjustment in volts. Ideally, the VCO output frequency will increase in direct linear proportion to any increase in the absolute magnitude of the error signal starting at zero. While the threshold could be adjusted to assure this condition, this threshold can be expected to drift because of current drift rates of any amplifier employed to provide the threshold adjustment. If the threshold were to drift in the positive direction, the deadband will reappear. If it drifts in the opposite direction, the VCO output frequency will be too high at null, causing a limit cycle.

Since the sign of the error signal is separated in these prior art systems, any drift in the sign detection portion of the synchronous demodulator will introduce a very undesirable condition and complicate any drift in the VCO. Even without any complicating VCO drift, there may be instability in the loop, and with complicating VCO drift there will most certainly be instability in the loop.

One prior-art solution is to select a fixed VCO output frequency for low amplitude error signals, and increase the frequency in proportion to the error signal above a positive threshold. Such a loop-gain characteristic results in high gain at null which reduces for increasing error until the threshold is reached, i.e. results in a VCO output frequency that is excessive at zero error and proportionally less excessive for higher error signals until it is just right when the error signal reaches the threshold. The VCO frequency then increases in proportion to the DC error. This characteristic will cause a corresponding drop in bandwidth in the region near null, and will result in an overshoot in the closed loop operation.

OBJECTS AND SUMMARY OF THE INVENTION

An object of the invention is to provide a bidirectional VCO which avoids the problems of nonmonotonicity and discontinuity at and near null.

Another object is to provide a bidirectional VCO with a truly linear gain characteristic in converting a DC error signal into a proportional frequency from zero in both positive and negative directions.

An object of this invention is to provide a closed loop position measuring system having conversion of DC error to frequency and sign that is monotonic for a constant bandwidth through zero.

A further object is to provide offset compensation for a closed loop position measuring system as a function of a single DC offset signal.

These and other objects and advantages are achieved by a bipolar integrator for integrating a DC input signal to produce a ramp output signal with a slope proportional to the amplitude of the DC input and a polarity related to that of the DC input signal. A pair of voltage comparators determines when the amplitude of the ramp signal exceeds a predetermined threshold level of either polarity, and activates a synchronous pulse generator for generating a single output pulse each time that level is exceeded. A binary storage element is set or reset according to which voltage comparator has exceeded the threshold level to store the polarity of the ramp signal. The bipolar integrator is reset each time a pulse is thus generated.

In the event the integrator is so saturated that it cannot be reset, and one of the threshold-level comparators continuously activates the synchronous pulse generator, a logic network within the synchronous pulse generator responds to that condition and enables synchronous pulses to be generated at a maximum rate equal to the system clock rate. Otherwise the logic network permits only one pulse to be transmitted, with at least one edge synchronized by a system clock pulse, until the integrator is reset to start a new pulse generating cycle.

When employed in a position measuring system for generating a train of pulses and a sign signal from a DC error signal, this bidirectional VCO is used with means for synchronously demodulating an AC error signal from a position follow-up device to produce the DC error signal with an amplitude proportional to the AC error signal and a polarity corresponding to the sign of the AC error signal in the DC error signal until the amplitude of the error is converted into a proportional frequency of a pulse train, and then detecting the sign only after the bipolar integrator has integrated enough of the DC error to positively and accurately establish the polarity of the error.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
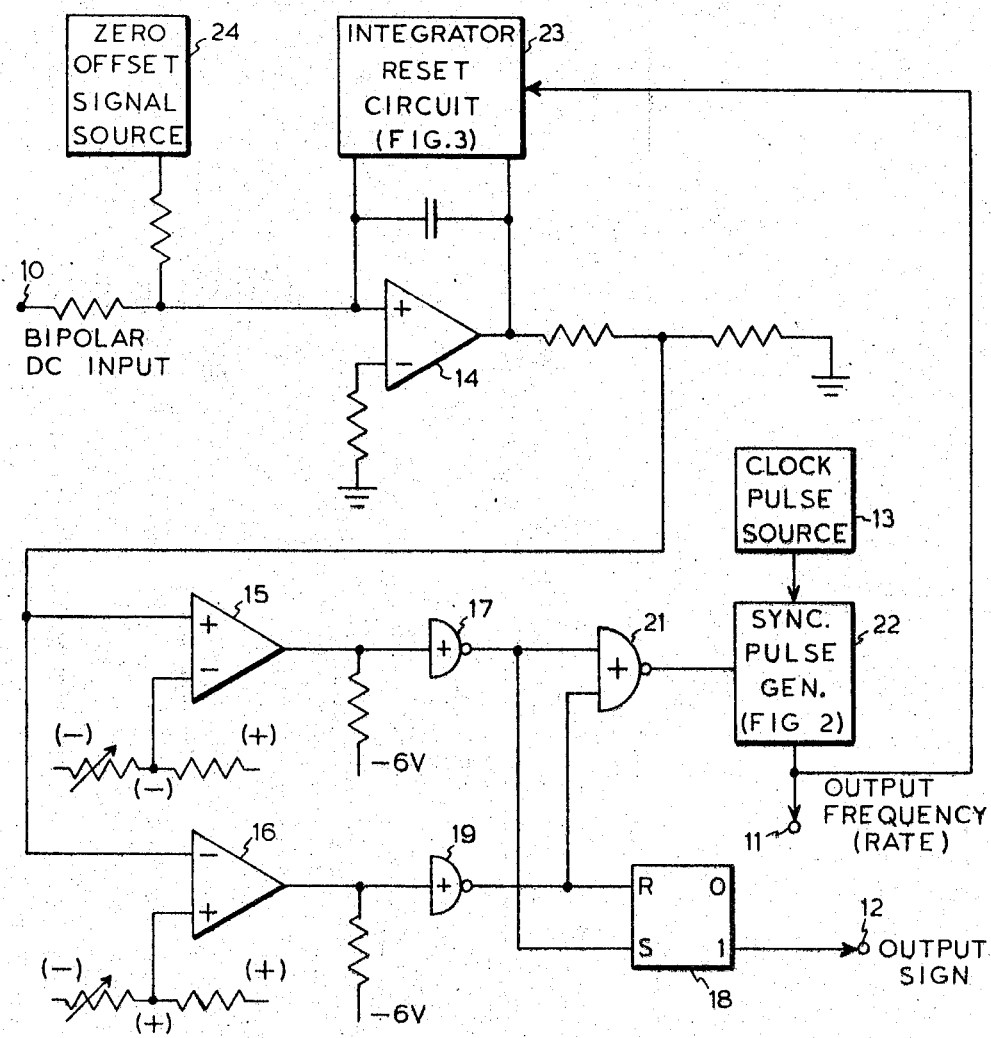
FIG. 1 is a diagram of a bidirectional VCO according to the present invention.

Referring to FIG. 1, a voltage controlled oscillator receives a bipolar DC input signal at a terminal 10 and delivers a train of pulses at an output terminal 11 with the correct sign at an output terminal 12. Each pulse is synchronized with a clock pulse from a source 13 at the trailing edge, and is at least as wide as a clock pulse, but not wider than two clock pulse cycles. The frequency of the output pulse train is linearly and monotonically proportional to the amplitude of the DC input. The output sign at terminal 12 always corresponds to the polarity of the DC input. When the input is negative, the output at terminal 12 is a binary 1, and when the input is positive, the output is a binary 0. Thus, as is conventional in many binary systems, a binary 1 represents a negative input signal and a binary 0 represents a positive input signal.

The DC input signal is applied to the summing junction of a bipolar integrator 14. The slope of the ramp output signal of the integrator will depend upon the amplitude of the input signal, and the polarity (+ or −) will depend upon the polarity (− or +) of the input signal. When the output of the integrator is between predetermined threshold levels (−5V and +5V), threshold voltage comparators (high gain differential amplifiers) 15 and 16 are not "qualified," and their outputs are high (binary 1). When the ramp output exceeds +5 volts (for a negative DC input), the comparator 15 is qualified and its output will go low (binary 0). An inverter 17 complements that output to a binary 1 and sets a flip-flop 18, thereby providing an output signal at terminal 12 that is a binary 1 indicating a negative DC input signal. When the integrator output exceeds −5 volts (for a positive DC input), the comparator 16 is qualified and its output will go low to reset the flip-flop 18 through an inverter 19.

It should be noted that when the DC input increases from null in either direction, the integrator will produce a qualifying signal in due time regardless of how low the input signal amplitude is, i.e. the integrator output will eventually exceed ± 5 volts, unless the average of the input signal is zero. This inherent averaging function of the integrator assures that information is not lost between generated output pulses. When a qualifying signal is generated, the sign of the DC input signal will be present in the qualifying signal and properly stored in the flip-flop 18. At the same time, and on the leading edge of the qualifying step signal on which the flip-flop 18 is set or reset, a signal is transmitted by whichever comparator exceeds its threshold level through a NOR gate 21 to a synchronous pulse generator 22 to transmit a synchronized pulse from the terminal.

It should be noted that once either one of the comparators 15 and 16 is qualified, the NOR gate 21 will transmit a continuous low signal (binary 0) to enable the synchronous pulse generator to transmit an output pulse. That activates logic in the pulse generator 22 to allow only one pulse to be transmitted, unless the integrator is saturated, as will be further explained with reference to FIG. 2, in which case pulses are transmitted at a maximum rate equal to the frequency of the clock pulse applied to the pulse generator.

Each transmitted pulse resets the integrator on the leading edge through a circuit 23, thus driving the output of the NOR gate 21 high again. At the trailing edge of the transmitted pulse, the pulse generator 22 is reset to complete a normal pulse generating cycle in synchronism with a clock pulse. That cycle is repeated at a rate proportional to the amplitude of the DC input signal, thus producing a train of output pulses at a rate that is proportional to that amplitude. The sign, once set, remains set until the polarity of the input signal changes. Thus the sign of the DC input is not separated from its magnitude, but is instead retained by the VCO in the process of producing the output pulse train. Conversion of the DC input to frequency and sign is therefore linear and monotonic.

The reference voltages for the two comparators are selected to be of equal amplitude, but opposite polarity, for a constant bandwidth through zero and substantial linearity as a function of the DC input.

The null point for the DC input may be adjusted by a zero-offset signal from a source 24 applied to the summing junction of the integrator 14. That source may include, for example, a thermistor for temperature compensation of the DC input signal source. This novel VCO thus reduces the offset compensation control to a single DC signal applied directly as an offset control. The stability and linearity of this offset compensation is improved over the method of compensation previously required in a closed-loop position measuring system to be described with reference to FIG. 4 because of the elimination of a requirement for amplitude modulation of the offset signal for addition to an AC error signal before synchronously demodulating to obtain a DC error signal. Accordingly, the present invention will make possible an improved position measuring system in numerical control servomechanisms, and such a position measuring system (inner loop) will have a constant bandwidth as a function of DC operating point.

Before proceeding with a brief description of a numerical control system employing the VCO of FIG. 1, the synchronous pulse generator 22 and reset circuit 23 of that VCO will first be described with reference to FIGS. 2 and 3. In each case the circuit is shown by way of example, and not limitation, because the required functions may be implemented by other circuit arrangements.

Figure 2:
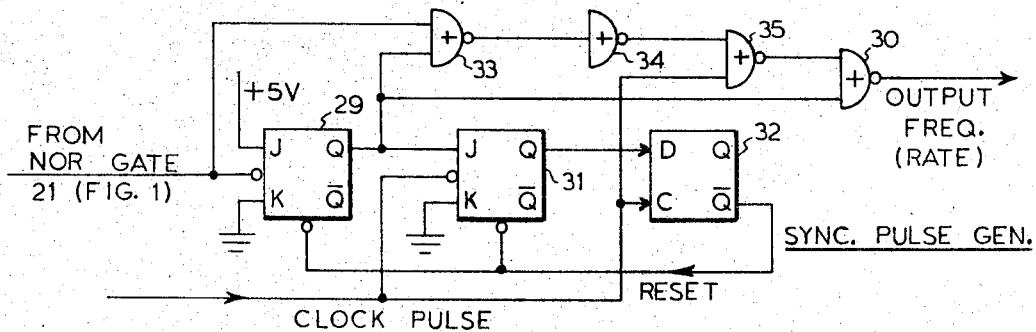
FIG. 2 is a logic diagram of an exemplary synchronous pulse generator for use in the VCO of FIG. 1.

Referring to FIG. 2, the transition from a high (binary 1) to a low (binary 0) level at the output of the NOR gate 21 (FIG. 1) will set a J–K flip-flop 29. Once the flip-flop 29 is thus set by a qualifying signal from either comparator, a NOR gate 30 (normally having both input terminals low and its output terminal high) receives a high input signal from the true (Q) output terminal of the flip-flop 29, thus immediately initiating at the output terminal 11 a negative-going pulse. The leading edge of that output pulse resets the integrator via the circuit 23 (FIG. 1). The first clock negative transition to occur thereafter sets a J–K flip-flop 31, and the next clock positive transition to occur thereafter sets a D-type flip-flop 32. The negative transition of the false ($\overline{Q}$) output of the flip-flop 32 resets the flip-flop 31 to permit the flip-flop 32 to also be reset by the next clock positive transition in sequence. At the same time the flip-flop 31 is reset, the flip-flop 29 is reset, thus terminating the negative-going output pulse from the NOR gate 30. In that manner, one pulse is transmitted for each qualifying signal from the comparators to provide a train of pulses at a rate directly proportional to the amplitude of the DC input to the VCO.

The second input terminal of the NOR gate 30 is normally held low by NOR gates 33 to 35 regardless of the state of the flip-flop 29 to block negative clock pulses applied to the gate 35 from being transmitted through the gates 35 and 30. The NOR gate 34 functions simply as an inverter to maintain the proper logic level for the control of the NOR gate 35.

Prior to a qualifying signal from either comparator, the input to the NOR gate 33 from the NOR gate 21 (FIG. 1) is high (binary 1). At the same time the true output (Q) of the flip-flop 29 is low (binary 0). Therefore, the output of the gate 33 is low and the logic level of the control to the gate 35 via gate 34 is high to block the negative-going clock pulses. When a qualifying signal occurs, the output to the gate 33 from the gate 21 goes low, but immediately the other input to the gate 33 goes high because the flip-flop 29 is set by the qualifying signal, thus maintaining the output of the gate 33 low to continue to block clock pulses at the gate 35. Once the integrator is reset, the input to the gate 33 is returned to a high level, and when the flip-flop 29 is reset, the second input to the gate 33 is returned to a low level. Since both input terminals of the gate 33 are virtually never low at the same time, the gate 35 is not enabled to transmit clock pulses during a normal cycle of the pulse generator.

It is recognized that the flip-flop 29 requires a finite time to be set, and that therefore both input terminals of the NOR gate 33 are both momentarily low to enable a clock pulse to be transmitted by the NOR gate 35 if one occurs during the transition period of the flip-flop 29. However, since that clock pulse will appear as a high level (binary 1) signal at the input to the NOR gate 30 at substantially the same time a high level (binary 1) signal reaches the gate 30 from the flip-flop 29, the result is only one output pulse for a normal cycle.

If the integrator becomes saturated by an excessively high DC input, the reset circuit will fail to reset it and the last qualifying signal transmitted by the comparators will continue uninterrupted. Since the flip-flop 29 is set only by the leading edge of the negative-going (+5V to 0) qualifying signal from the NOR gate 21, another normal cycle for generating an output pulse is not generated until the integrator is reset. In the meantime, the frequency of the output pulse train would drop to zero. In order to maintain the output pulse train at a maximum rate during saturation of the integrator, the NOR gate 33 enables the NOR gate 35 to transmit clock pulses through the NOR gate 30 as the output pulses.

Assuming that the frequency of the clock pulses is 800 KHz, and that the integrator can be reset in one microsecond, the highest possible output pulse rate from the synch pulse generator of the VCO is 400 KHz. That is because it requires two clock pulses to reset the flip-flop 29. Once reset, the integrator has a minimum of 1.5 microseconds to produce another qualifying level. If it cannot be reset, because it is saturated, the output pulse rate will be the clock pulse rate (800 KHz). In a numerical control system, that will increase the rate at which the system error is reduced, until the integrator is no longer saturated. In other applications it may be desirable to simply maintain the output pulse train at the highest possible rate of 400 KHz, instead of at twice that rate. If so, it would be necessary to simply insert a T-type flip-flop between the NOR gate 30 and the NOR gate 35 to change state with every input clock pulse as long as the control input from the output of the NOR gate 33 is high (binary 1), i.e. to simply divide by 2 the clock pulses from the NOR gate 35.

In still other applications where the integrator is provided with diode limiters to prevent it from being driven into saturation, the NOR gates 33 to 35 may be omitted. NOR gate 30 then functions simply as an inverter. To then complement the output pulse generated by the flip-flop 29 more directly, the output of the synch pulse generator may be taken directly from the false ($\overline{Q}$) output terminal, rather than the true output terminal (Q) via the NOR gate 30. Still other modifications will occur to those skilled in the art for a synchronous pulse generator useful in practicing the present invention in different environments. For example, to synchronize both the leading and trailing edge of pulses generated, the pulse train output may be taken from the true (Q) output terminal of the flip-flop 31, instead of the flip-flop 29. Here the output is taken from the earlier flip-flop 29 in order to reset the integrator at the earliest opportunity during normal (unsaturated) operation, but while the flip-flop 29 is used to reset the integrator, the flip-flop 31 could be used to generate the output pulses. Because of these and many other modifications that are possible, it is evident that the present invention is not limited to this synchronous pulse generator illustrated in FIG. 2.

Figure 3:
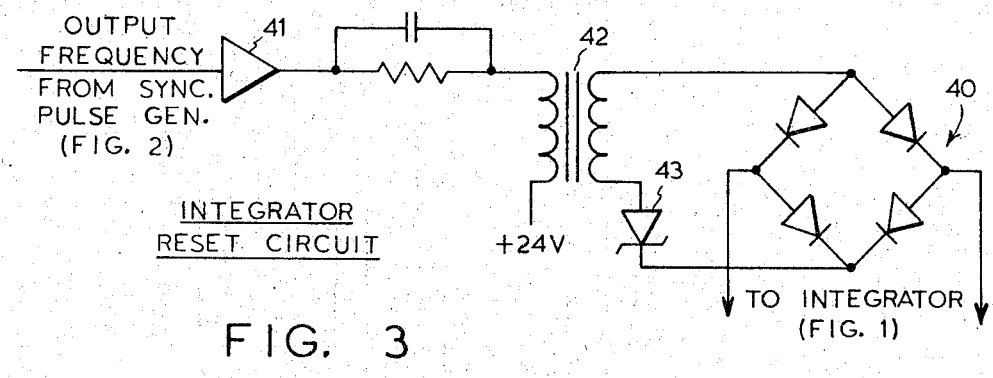
FIG. 3 is an exemplary circuit diagram of means for resetting an integrating means in the VCO of FIG. 1.

The integrator reset circuit 23 (FIG. 1) is shown in FIG. 3. It is comprised of a diode bridge 40 connected across the integrator. When all diodes are forward biased by a current pulse, produced at the leading edge of a VCO pulse by an amplifier 41 and a transformer 42, the output terminal and the summing junction of the integrator are brought to the same potential. This will remove the charge from the integrating capacitor within one microsecond. When there is no positive current through the bridge, a 7.5 volt zener diode 43 is reverse biased, thereby providing a high impedance path across the diode bridge. In that manner the diode bridge switch is provided with DC isolation from the control circuit due to the use of the transformer, a low impedance path for discharging the integrating capacitor due to the low impedance of forward biased diodes, and a high cutoff impedance through the diode switch for an integrator output of either polarity due to the high impedance of the reverse biased zener diode.

It should be noted that in some applications other electronic switches may be employed in place of the diode bridge and zener diode, such as a field-effect transistor, depending upon the rate at which the integrator must be reset to meet the operating requirements of the system employing the VCO of FIG. 1. Accordingly, while the diode-bridge arrangement shown is preferred because of the isolation, speed and high cutoff impedance it provides, the present invention is not limited to the use of such an arrangement.

Figure 4:
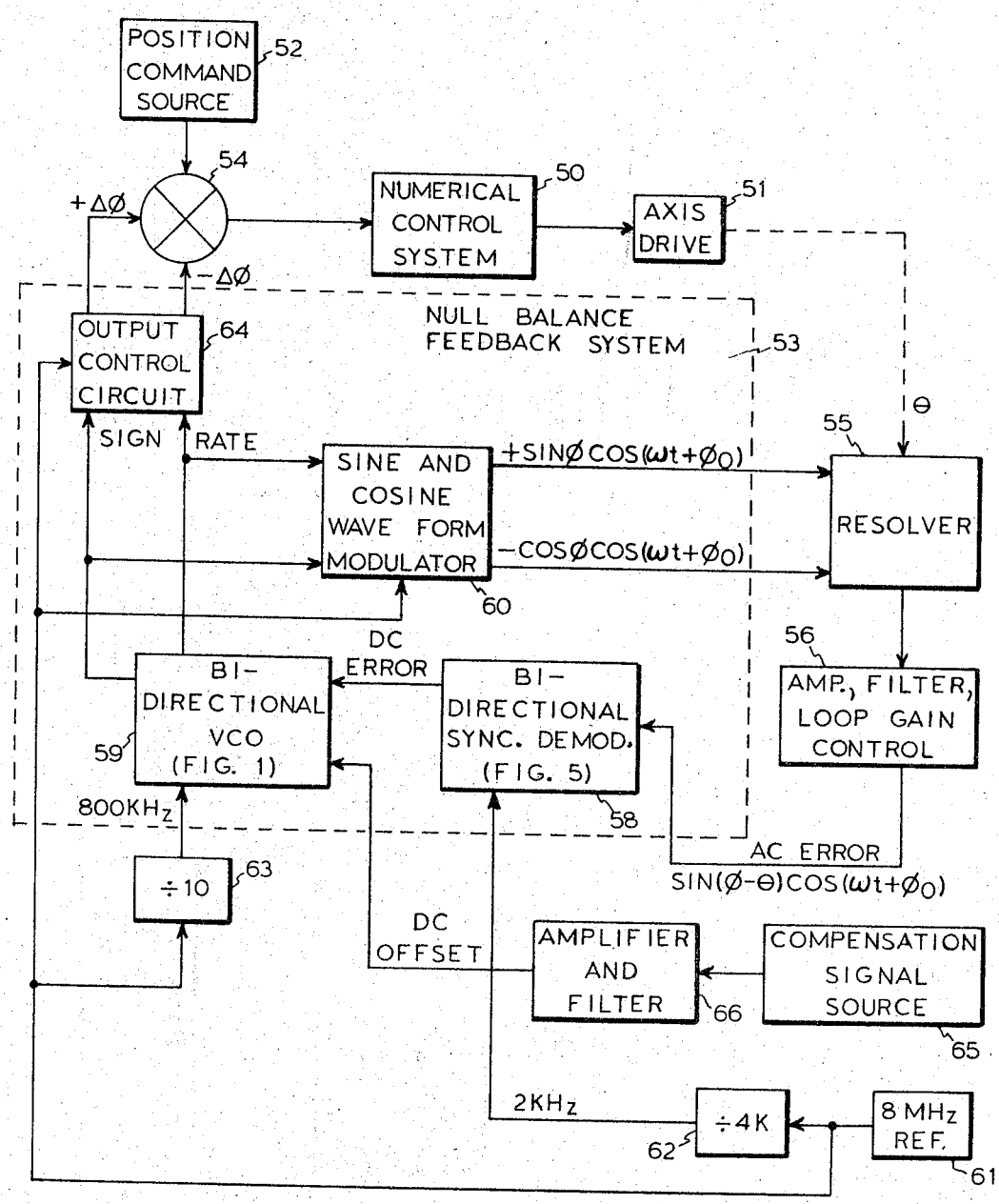
FIG. 4 is a functional block diagram of an exemplary position measuring system for a numerical control servomechanism employing the VCO of FIG. 1.

Referring now to FIG. 4, a numerical control system 50 is shown for control of a machine tool drive mechanism 51 along one of two or three possible axes. The numerical control system receives a position command signal in the form of pulses from a source 52 to advance the axis drive mechanism 51. The numerical control system receives a position command signal in the form of pulses from a source 52 to advance the axis drive mechanism 51. The numerical control system integrates those pulses and feedback pulses from a null balance feedback system 53 to null the command signal. To accomplish that, the feedback pulses from the system 53 are in the form of positive and negative pulses (here designated as $+\Delta\phi$ and $-\Delta\phi$ pulses) which are arithmetically added to position command pulses through suitable summing means 54.

Figure 5:
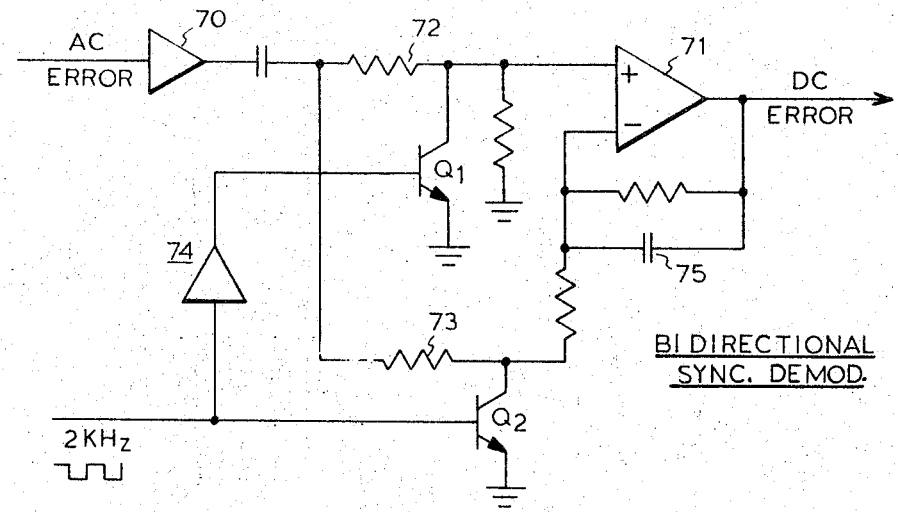
FIG. 5 is a circuit diagram of an exemplary bidirectional synchronous demodulator for use in the system of FIG. 4.

The null balance feedback system 53 receives an amplitude modulated feedback (error) signal sin $(\phi-\theta)$ cos $(\omega t+\theta_o)$ from a position follow-up device 55 (shown to be a resolver, although, as noted hereinbefore, it may also be an Inductosyn). A circuit 56, comprised of an amplifier, filter and loop-gain-control means couples the error signal directly to a bidirectional, synchronous demodulator implemented in accordance with the circuit diagram of FIG. 5. The output of the demodulator is then applied to a bidirectional VCO 59 implemented in accordance with the present invention as described with reference to FIG. 1.

The output of the VCO is applied to a sine and cosine waveform modulator 60 to generate two amplitude modulated carrier waveforms that are applied to the stator coils of the resolver 55. The two waveforms are sin $\phi$ cos $(\omega t+\phi_o)$ and $-$ cos $\phi$ cos $(\omega t+\phi_o)$, where cos $(\omega t+\phi_o)$ is the carrier modulated by signals having the values sin $\phi$ and $-$ cos $\phi$. The angle $\phi_o$ represents the initial condition of the closed loop position measuring system, and the angle $\phi$ represents the updated condition of the closed loop. The frequency $\omega$ and initial phase angle $\phi_o$ of the system is maintained stable by the waveform modulator 60 because it is synchronized with a stable reference signal (8 MHz) from a source 61.

The mechanical coupling from the axis drive mechanism turns the rotor of the resolver 55, thereby introducing the angle $\theta$ in the error signal induced in the rotor coil. Accordingly, the error signal has the form sin $(\phi - \theta)$ cos $(\omega t+\phi_o)$. When the feedback system angle $\phi$ is equal to the resolver coupling angle $\theta$, the sinusoidal error signal will have the form sin (0) cos $(\omega t +\phi_o) = 0$, where the frequency $\omega$ and initial phase angle $\phi_o$ exactly correspond to the frequency $\omega$ and phase angle $\phi_o$ of a synchronizing signal applied to the demodulator 58 from a reference source 61 via a suitable frequency divider 62. Here the output frequency of the divider 62 is selected to be 2 KHz, i.e. $\omega$ is selected to be 4$\pi$KHz.

Because the inner loop formed by the waveform modulator 60 quickly updates the angle while the command signal from the source 52 is being nulled in response to the output signal from the synchronous demodulator 58, the angle $\phi$ is a measurement of the resolver coupling angle $\theta$. In other words, while the null balance feedback system 53 provides a position feedback signal to null a command signal from the source 52, it also nulls the error signal from the rotor of the resolver 55.

To control the waveform modulator 60 in such a manner as to appropriately shift the angle $\phi$ in response to the output signals of the demodulator 58, the sign and frequency outputs of the VCO are applied directly to the modulator to effectively cause extra pulses to be applied to one of a pair of modulation counters while pulses are deleted from the other, as described more fully in the aforesaid copending application from which it can be seen that the modulator counters effectively divide the output of the source 61 by 4K. The result is modulation of the carrier cos $(\omega t + \phi_o)$ by sin $\phi$ and $-$cos $\phi$. Thus the rate at which pulses are inserted and deleted in the modulation counters driven by clock pulses from the source 61 is determined by the VCO synchronized by the clock from the source 61 via a frequency divider 63 and controlled by the DC error signal from the synchronous demodulator 58. The frequency divider 63 and reference signal source thus function as the clock pulse source for the bidirectional VCO 59. As the angle $\phi$ approaches the angle $\theta$, the rate decreases toward zero, and when both angles are equal, the rate is effectively zero. It is therefore evident that pulses from the VCO will cause the system angle $\phi$ to be altered, but since synchronized modulator counters are employed to generate both of the sine and cosine modulated waveforms to the stator coils of the resolver 55, the initial condition angle $\phi_o$ is not at any time altered.

The frequency and sign output of the VCO, are both also applied to an output control circuit 64 which transmits $\pm\Delta\phi$ pulses to the numerical control system 50 through the summing means 54. The system reference signal from the source 61 is also applied to the output control circuit 64 to assure that the $\Delta\phi$ pulses transmitted to the numerical control system are synchronized with changes in the system angle $\phi$ being made in the inner loop of the null balance feedback system. In practice, the output control produced by the circuit 64 may be a by-product of, or actually derived from, input control stages of the waveform modulator 60, but for clarity the control circuit 64 is shown as a separate functional block having the same input signals as the waveform modulator 60.

When the control circuit 64 is combined with the input control stages of the waveform modulator 60, it is convenient, and often desirable to provide a hysterisis function to gate $\Delta\phi$ pulses out to the numerical control system 50, and the sine and cosine modulator counters only when the sign has not changed since the last $\Delta\phi$ output pulse. This is desirable when there is a one-bit limit cycle in the inner loop since obviously that one bit should not be transmitted by the control circuit as a feedback signal to the numerical control system 50. In other words, if the limit to which the system angle $\phi$ can be altered to correspond with the machine coupling angle $\theta$ is one cycle of the reference signal from the source 61, the output control circuit can be provided with a hysterisis to gate an output pulse only when the sign has not changed since the last output pulse. In that manner, $\Delta\phi$ pulses may be effectively applied to the counters of the waveform modulator 60 such that the system angle $\phi$ will vary back and forth across the value of the machine coupling angle $\theta$ by an amount corresponding to one cycle of the system clock without causing a corresponding jitter in the numerical control system 50.

As noted hereinbefore, the VCO of the present invention reduces the requirement of an offset compensation system to a simple DC signal. In practice the offset compensation signal derived from a suitable source 65 is amplified and filtered by a suitable circuit 66 before it is applied to the VCO for direct arithmetic addition to the DC error signal.

The bidirectional synchronous demodulator 58 converts the sinusoidal error signal into a DC error signal having an amplitude proportional the sine of the difference between the angle $\phi$ and the angle $\theta$ and a polarity corresponding to the sign of the AC error signal, i.e. the demodulator converts the AC signal $\sin(\phi - \theta) \cos(\omega t + \phi_o)$ to a DC signal $K \sin(\phi - \theta)$. That is accomplished by a simplified circuit shown in FIG. 5 in which the AC error is amplified by an inverting amplifier 70 and applied to differential inputs of an operational amplifier via resistors 72 and 73. The output of the operational amplifier 71 would normally be equal to the difference between the signal applied to its differential input terminals, but is instead a DC signal proportional to the AC error with a sign corresponding to the phase of the AC error signal. That is the effect of half-wave synchronous detection resulting from alternately switching transistors $Q_1$ and $Q_2$ on to connect the resistors 72 and 73 to ground using the synchronizing signal from the frequency divider 62 (FIG. 4) directly for the transistor $Q_2$ and through an inverting amplifier 74 for the transistor $Q_1$. A capacitor 75 in the feedback circuit of the operational amplifier 71 filters the DC error output. In that manner a phase sensitive demodulator and filter provides a DC error signal with sign and magnitude information combined. The VCO then converts the error signal to a proportional frequency and proper sign signals. The resulting conversion is thus linear and monotonic. If offset compensation for the error signal is required, it is simply added arithmetically to the DC error input at the VCO, thus eliminating the requirement for amplitude modulation of the offset compensation signal for greater stability and linearity of the offset compensation.

Although particular embodiments of the invention have been described and illustrated herein, it is recognized that modifications and variations may readily occur to those skilled in the art. An important modification is substitution of an Inductosyn for a resolver in the system of FIG. 4, as suggested hereinbefore. All that would be required to accommodate an Inductosyn is a 90° phase shift network between the frequency divider 62 and the synchronous demodulator 58. Consequently, it is intended that the claims be interpreted to cover such modifications and variations.

What is claimed is:

1. In a closed loop position measuring system of a numerical control servomechanism having position follow-up feedback through a mechanical coupling to a moving coil of a three-terminal position feedback device selected from a group consisting of a resolver and an Inductosyn, and having the respective orthogonal stationary coils of said device excited with a carrier signal maintained at a stable frequency and amplitude modulated in accordance with values of $\sin \phi$ and $\cos \phi$, where $\phi$ is a phase angle of the closed loop position measuring system continually updated by a single train of pulses in a direction indicated by a binary sign signal to null the amplitude modulation of the output of said moving coil, said amplitude modulation being a trigonometric function of $(\phi-\theta)$, where $\theta$ is the position angle of said mechanical coupling, and where said amplitude modulation of said output is detected by a synchronous demodulator receiving a signal from said moving coil to obtain a bipolar DC error signal, the combination of a bidirectional voltage controlled oscillator responsive to said DC error signal for producing said single train of pulses at a frequency proportional to the amplitude of said DC error signal, and for further producing said binary sign signal representing the polarity of said DC error signal, said bidirectional voltage controlled oscillator being comprised of an analog bipolar integrator responsive to said bipolar DC error signal for producing a ramp output signal having a slope proportional to the amplitude of said DC error signal and a polarity corresponding to the polarity of said DC error signal, a pair of voltage comparators connected to receive said ramp signal, one comparator for determining when said ramp signal exceeds a predetermined threshold level of a given polarity and the other comparator for determining when said ramp signal exceeds a predetermined threshold level of a polarity opposite said given polarity, a pulse generating means coupled to said pair of comparators for producing an output pulse of said single pulse train each time said ramp signal crosses one of said threshold levels of either polarity from a level closer to zero, means responsive to said output pulse for resetting said integrator, thereby causing said integrator, pair of comparators and pulse generating means to operate in combination to produce a train of pulses at a rate proportional to the amplitude of said DC error signal, and a flip-flop having a first input terminal connected to said one comparator for setting said flip-flop to a given state when said ramp signal exceeds said threshold level of said one polarity, and a second input terminal connected to said other comparator for setting said flip-flop to a state opposite said given state when said ramp signal exceeds said threshold level of said other polarity, thereby continually and correctly determining and storing polarity information of said DC error signal for use with said train of pulses.

2. The combination of claim 1 wherein said pulse generating means comprises a flip-flop so coupled to said pair of comparators as to be set to a given state each time said ramp signal crosses one of said threshold levels of either polarity from a level closer to zero, and means for resetting said pulse generating flip-flop after the lapse of a predetermined period of time.

3. The combination of claim 2 including a source of clock pulses operating at a rate greater than the maximum rate of output pulses which can be produced by said pulse generating means cooperating with said integrator and pair of comparators, and a first logic gate so connected to said pair of comparators and said pulse generating flip-flop as to produce a control signal when said means for resetting said integrator has failed to reduce said ramp output signal below said threshold levels of said voltage comparators and generation of a single pulse has terminated by said pulse generating flip-flop being reset, a second logic gate coupled to said first logic gate and to said clock pulse source for transmitting clock pulses in response to said control signal, and means for combining into said train of pulses produced by said pulse generating flip-flop clock pulses transmitted by said second logic gate.

4. The combination of claim 3 wherein said means for resetting said pulse generating means comprises a counter connected to said pulse generating flip-flop for counting a predetermined number of said clock pulses, and a connection from said counter to said pulse generating flip-flop for resetting said pulse generating flip-flop upon said predetermined number of clock pulses being counted.

5. The combination of claim 1 wherein said integrator includes means for adding a zero-offset signal to said DC error signal being integrated.

6. In a numerical control system for positioning an element, said system having a feedback loop including a device excited by a signal of constant carrier frequency for measurement of the difference between actual position and desired position of said element, said device producing an AC error signal having an amplitude proportional to said difference and one of two opposite phases corresponding to the sign of said difference, apparatus for converting said AC error signal into a single train of pulses at a frequency proportional to said difference and a binary signal representing said sign for use with said train of pulses to reduce said difference to zero, said apparatus being comprised of phase-sensitive demodulating means synchronized with said carrier signal for converting said AC error signal to a DC error signal of amplitude and polarity corresponding to respective amplitude and phase of said AC error signal, means for integrating said DC error signal to produce an integrator output signal with a polarity related to that of said DC error signal, means for determining when the amplitude of said integrator output signal exceeds predetermined positive and negative amplitude levels, means activated by said determining means for generating an output pulse of said single pulse train each time said predetermined level is exceeded, of either polarity, means for storing a signal representing the polarity of said integrator output signal at the time either of said predetermined levels has been exceeded, said storing means continually transmitting said binary signal as a representation of said sign of said difference between actual position and desired position of said element, and means responsive to said pulse generating means for resetting said integrating means in response to each pulse generated.

7. The combination of claim 6 wherein said integrating means includes means for adding a zero-offset signal to said DC error signal being integrated.

8. The combination of claim 6 wherein said determining means is comprised of a pair of voltage comparators connected to receive said integrator output signal, one comparator for determining when said integrator output signal exceeds a predetermined threshold level of a given polarity and the other comparator for determining when said integrator output signal exceeds a predetermined threshold level of a polarity opposite said given polarity, and wherein said pulse generating means is comprised of a flip-flop so coupled to said pair of comparators as to be set to a given state each time said ramp signal crosses one of said threshold levels of either polarity from a level closer to zero and means for automatically resetting said pulse generating means after a predetermined minimum period of time.

9. The combination of claim 8 wherein said storing means for said sign is comprised of a set-reset flip-flop having a first input terminal connected to said one comparator for setting said set-reset flip-flop to a given state when said integrator output signal exceeds said threshold level of said one polarity, and a second input terminal connected to said other comparator for setting said set-reset flip-flop to a state opposite said given state when said integrator output signal exceeds said threshold level of said other polarity, thereby continually producing at an output terminal of said set-reset flip-flop said binary signal transmitted as a representation of said sign.

10. The combination of claim 9 including a source of clock pulses operating at a rate greater than the maximum rate of output pulses which can be produced by said pulse generating means cooperating with said integrating means and said pair of comparators, a first logic gate so connected to said pair of comparators and said pulse generating flip-flop to produce a control signal when said means for resetting said integrator has failed to reduce said integrator output signal below said threshold levels of said voltage comparators and generation of a single pulse has been terminated by said pulse generating flip-flop being reset, a second logic gate coupled to said first logic gate and to said clock pulse source for transmitting clock pulses in response to said control signal, and means for combining into said train of pulses produced by said pulse generating flip-flop all clock pulses transmitted by said second logic gate.

* * * * *